Sept. 16, 1924.
C. H. DIENER
MOTOR TESTING VALVE
Filed Aug. 1, 1921
1,508,543
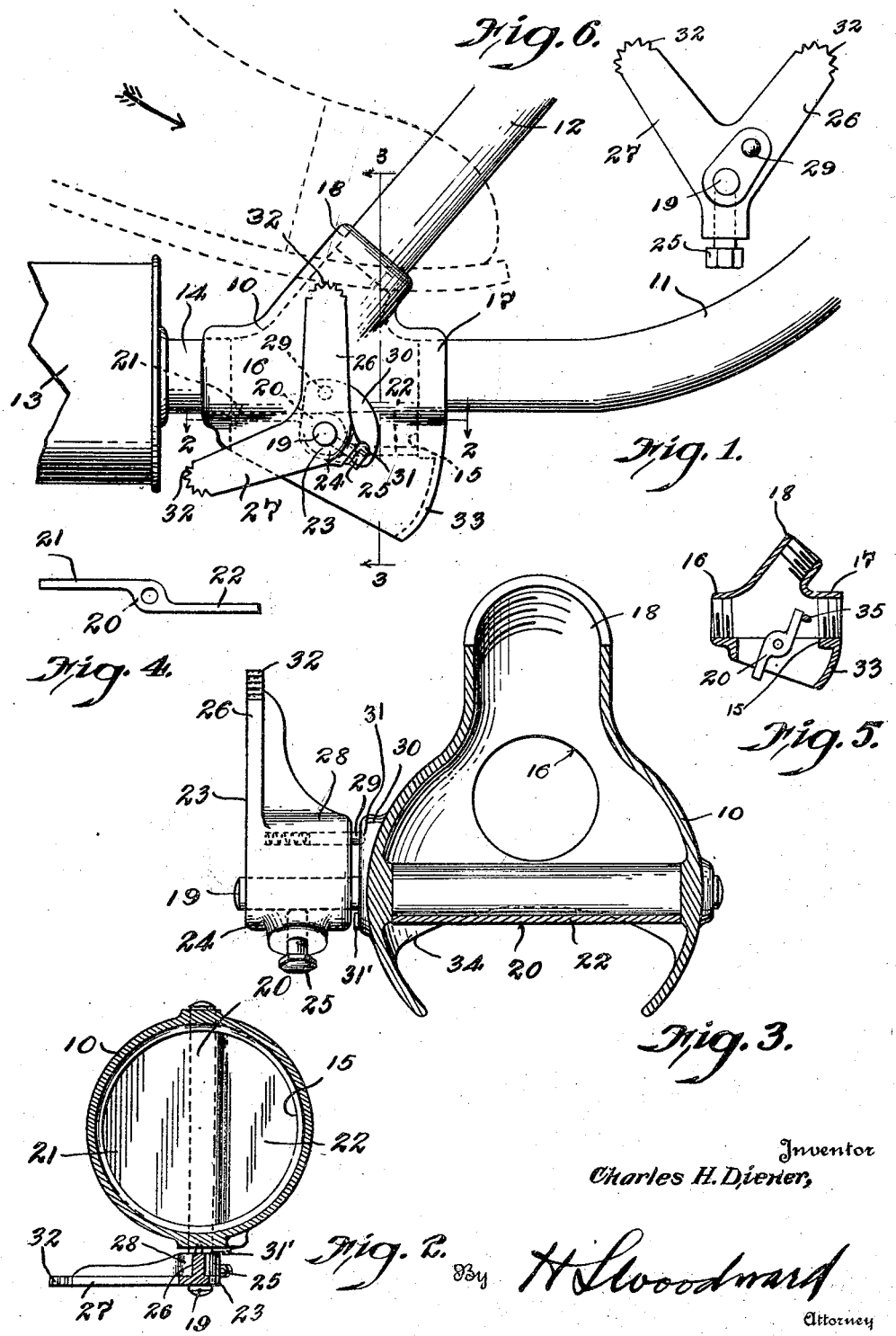
Inventor
Charles H. Diener,
By H.␣Woodward
Attorney Patented Sept. 16, 1924.

1,508,543

UNITED STATES PATENT OFFICE.

CHARLES H. DIENER, OF POTTSTOWN, PENNSYLVANIA.

MOTOR-TESTING VALVE.

Application filed August 1, 1921. Serial No. 488,844.

*To all whom it may concern:*

Be it known that I, CHARLES H. DIENER, a citizen of the United States, residing at Pottstown, in the county of Montgomery and State of Pennsylvania, have invented certain new and useful Improvements in Motor-Testing Valves, of which the following is a specification.

The invention has for an object to effect improvements in valves useful especially for incorporation upon exhaust conduits of internal combustion engines in advance of mufflers, whereby it may be used in testing engines and otherwise as customary. It is a particular aim to provide a device of this kind having special advantages for use in testing motorcycle motors.

Additional objects, advantages and features of invention reside in the combination, arrangement and construction of parts, as may be readily understood from the description hereinafter and from the drawings, in which, Figure 1 is a side elevational view of a device constructed in accordance with my invention, and incorporated upon a motorcycle.

Fig. 2 is a cross sectional view on the line 2—2 of Fig. 1.

Fig. 3 is a vertical sectional view on the line 3—3 of Fig. 1.

Fig. 4 is an edge view of the valve element detached.

Fig. 5 is a longitudinal section of the valve.

Fig. 6 is a view of the operating pedal.

There is illustrated a valve casing 10 connected to the front cylinder exhaust pipe 11 and the rear cylinder exhaust pipe 12 of an internal combustion engine, and arranged normally to deliver gases passing therethrough to a muffler 13 through a nipple 14.

The casing 10 in its upper and intermediate portions is spherical in form and hollow, and formed with a cylindrical seat face 15, the medial plane of which is horizontal and diametrical. Above the plane of the seat 15, the casing 10 is formed with a horizontal cylindrical rearward outlet enlargement 16, interiorly threaded to properly receive the nipple through which gases may pass to the muffler, and this may comprise the supporting means for the device, alone, or in conjunction with the engagement of one or both the pipes 11 and 12 in the casing. A forward enlargement 17 similar to and in alignment with the one 16 is formed on the case 10, receiving the pipe 11, while a similar enlargement and projection 18 receiving the pipe 12 is formed at the top of the casing, inclined forwardly with its axis at an acute angle to the axis of the enlargement 17. On a level with the medial plane of the seat 15, a horizontal shaft 19 is mounted in the casing, at right angles to the direction of the enlargements 16 and 17, this shaft having a butter-fly valve 20 mounted thereon, each of the wings being offset to lie in parallel planes spaced on opposite sides of the axis of the valve shaft. When in normal closed position, the rear wing 21 is uppermost. The wings are so shaped that when in horizontal position they fit snugly against the face of the seat 15, and it will be appreciated that tendency of the valve to rotate counter-clockwise, as viewed in Fig. 1, will cause the edges of the wings to bear against the valve seat, and tend to wedge therein, although the angle of incidence in the engagement of the valve with its seat is such that actual wedging will not occur, but a snug closure of the valve be assured at all times when it is pressed into engaging position. The shaft 19 projects from one side of the casing, the right hand side in the present instance, which is also the outer side with respect to usual motors when the device is applied to use. An operating lever 23 is secured upon the projecting end of the shaft 19, this lever being in the form of a bell-crank, and having a boss 24 at the junction of the arms, on the outside, through which a set screw 25 is engaged to impinge upon the shaft 19 and hold the lever in adjusted position thereon. Ordinarily, the lever is adjusted with one arm 26 projecting vertically upward when the valve is in closed position, the other arm 27 extending rearwardly and slightly downward, as shown. The lever is formed with a hub portion 28 at the inner side, in which a spring-pressed plunger 29 is mounted, parallel to the axis of the shaft 19 and projected through the inner side of the hub 28 toward the casing 10. The casing 10 is provided with a boss 30 having recesses 31 therein arranged to receive the plunger 29 when the valve is at respective limits of its movement, or such intermediate positions as may be desired. The recesses and the end of the plunger may be so formed that the plunger will ride out of a recess when sufficient force is exerted upon either of the levers. It may be found desirable to provide a raised shoulder 31' beside the lowermost recess in the boss 30 in the direction of opening movement of the valve, so that it will not tend to pass beyond maximum open position.

The extremities of the arms 26 and 27 are spurred as at 32, whereby pressure of the sole of the shoe of the operator thereon will be sufficient to enable proper movement of the lever and actuation of the valve as desired.

It is to be noted that the lower wall 33 of the casing is extended downwardly at the forward side a greater distance than at the rear side, and is shaped so as to form a circular opening 34 which in conjunction with the spherical shape of the casing, has an effect of giving very distinct sounding of the separate explosions of the engine with which it may be associated. The seat 15 at the forward side, is also set inwardly a distance from the wall 33 so that as soon as the lower wing 22 of the valve passes below the seat, exhaust at this side of the valve will begin. It will also be noted that when the valve is in full open position, the exhaust from the front cylinder pipe 11 will tend to be warded downwardly through the deeper forward side of the casing by the valve itself, and as the rear edge of the opening 34 is very close to the valve seat 15, there will be a difference in the sound of exhaust from the front and rear cylinders in the case of a two cylinder engine connected as described, readily enabling the detection of faulty explosion in either cylinder.

The device has especial advantage for economical manufacture, ease of installation and compactness, as well as readiness of operation by the foot of a motor cyclist.

A forward pressure of the foot when rested upon the arm 26 as dotted in Fig. 1 will move the valve toward open position, and as the arm 26 moves past a position where it could be readily returned to closed position by the foot of the operator, the second arm 27 comes into position where it can easily be operated for that purpose. This will obviate the necessity for a cyclist dismounting while on the road when desirous of operating a testing valve to hear more clearly the sound of the exhaust.

It may be desirable for some forms of motors to arrange the axis of the shaft 19 in a different relation to the conduits leading into the casing, which may be done as found requisite.

In Fig. 5 I have shown a stop lug 35 formed integrally with the valve casing, located upon the interior, for checking opening movement of the valve 22. In the event that the lug 35 is employed in the valve, it will, of course, be understood that the checking device 31' is eliminated.

It has been found, in practice, that in certain types of machines, the kick starter pedal interferes with the opening and closing of the valve, with the operating levers 26 and 27, formed as shown in Fig. 1. However, by forming the levers at an acute angle to each other, as indicated in Fig. 6, operation of the kick starter may be accomplished with the valve in either open or closed position, without interference.

What is claimed is:—

1. A motor testing valve comprising a casing having two inlets and a normal outlet, and having a auxiliary outlet port of large area, a valve to close the auxiliary port movable within the casing to a position intermediately of the inlets, whereby difference of direction in the sounds of exhaust from the two inlets will be produced.

2. A motor testing valve comprising a casing having two inlets and a normal outlet for a muffler connection, the inlets being directed toward the outlet, an exhaust port in the case having a seat, a valve therefor movable to interpose when open a substantial part between the paths of gases entering the inlets, whereby difference in the sound of discharge from the two inlets will be produced thereby.

In testimony whereof I have affixed my signature in presence of two witnesses.

CHARLES H. DIENER.

Witnesses:
 FRANKLIN D. HOFFMAN,
 HARPER R. DIENER.